Jan. 31, 1939.　　　B. M. YANKOVITCH　　　2,145,565
WHEEL CONSTRUCTION
Filed July 7, 1936
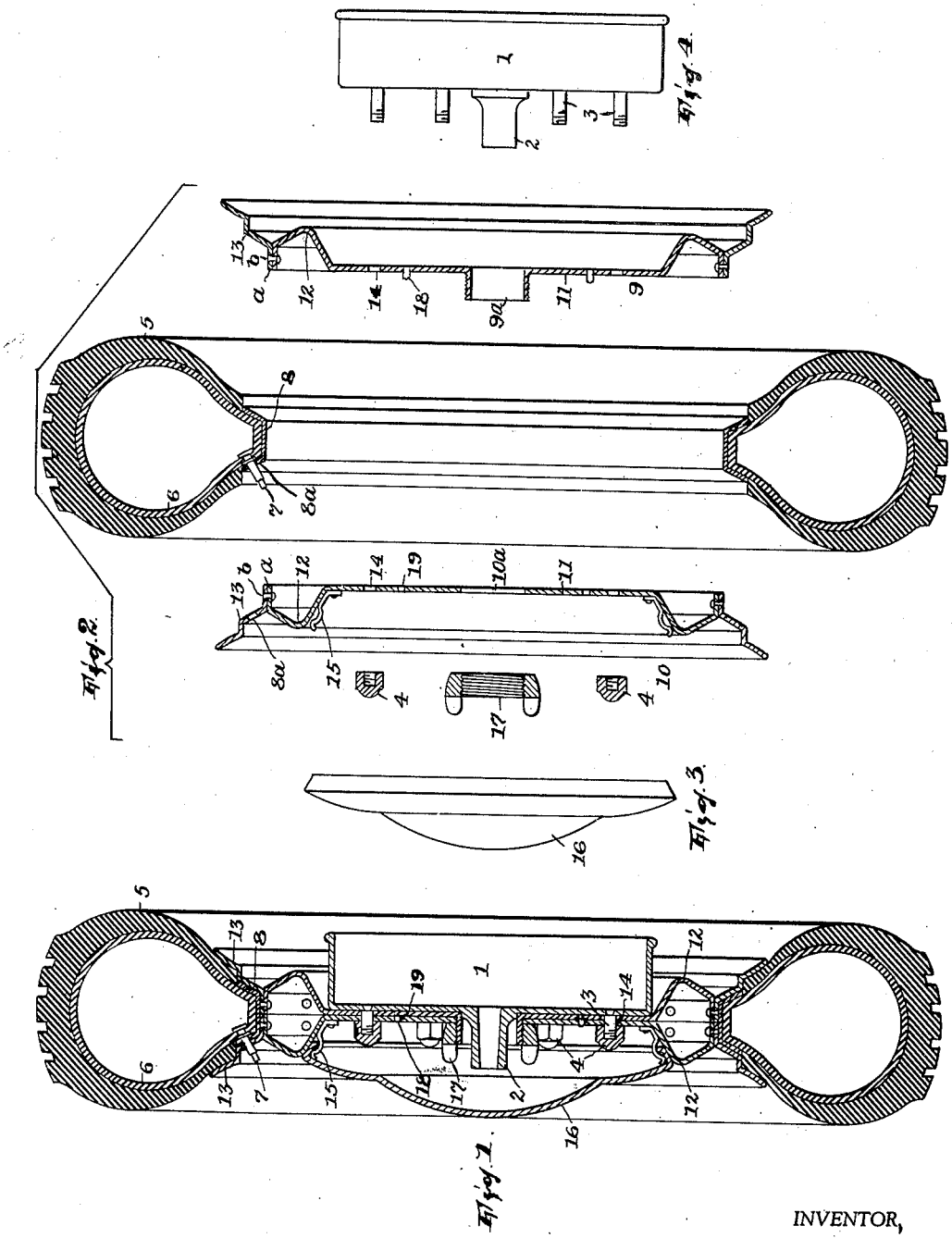
INVENTOR,
Bozhidar M. Yankovitch,
BY
John W. Steward
ATTORNEY.

UNITED STATES PATENT OFFICE 2,145,565

WHEEL CONSTRUCTION

Bozhidar M. Yankovitch, Paterson, N. J.

Application July 7, 1936, Serial No. 89,295

1 Claim. (Cl. 301—63)

This invention relates to wheel structures and especially to wheel structures of the class in which the wheel proper (or as I term it herein, the wheel) is formed sectionally so as to permit application thereto or removal therefrom of a tire, as a pneumatic tire.

According to the invention in one aspect thereof the improved wheel comprises inner and outer discal sections having central portions of relatively large diameter and arranged in face to face relation, or at least in juxtaposition, to each other and their marginal portions together forming a circumferential tire-receiving groove, the inner section having a central threaded boss penetrating centrally the outer section, and a nut screwed on the boss outward of the outer section and clamping said sections together. Thus a unitary structure is formed, completed by the two sections and the nut.

According to the invention in another aspect thereof and having regard to the mounting of the wheel on a rotary part, as the brake-drum of a vehicle, given the wheel as above stated, there are means, arranged at intervals around the boss, removably securing the wheel to the drum.

In the best form each section is formed between its said central and marginal portions with an annular portion which is bulged, the bulge of each section being away from the other section. As to the outer section a cavity is thus formed for reception of a hub-cap, and as to the inner section the bulge forms a cavity about equal in diameter to the drum, thus to facilitate centralizing the wheel in assembling it with the drum. The bulges also strengthen the wheel.

The wheel sections, except for the mentioned central boss and hole, are substantial counterparts of each other so that they may both be stamped out from sheet metal in the same die.

In the drawing,

Fig. 1 is a diametric section of the complete wheel structure and the drum to which such wheel structure is affixed;

Fig. 2 is a similar view of the tire, the parts of the wheel, and the nuts by which the wheel structure is affixed to the drum;

Fig. 3 is a side elevation of the hub-cap; and

Fig. 4 is a side elevation of the drum.

The brake-drum, or drum, 1 has a central stud 2 and the usual equally spaced and eccentric threaded studs 3 all projecting from its outer (left-hand) face, the studs 3 being adapted to receive nuts 4.

The tire comprises as usual a casing 5 open at its inner perimeter and the inner tube 6 which may be equipped, as usual, with an inflation valve 7. Preferably there is an exterior channeled annulus 8 in which the inner perimetrical portion of the inner tube seats, for a purpose to appear; this may have an aperture 8a through which the valve 7 protrudes.

The wheel is constructed as follows:

There are two generally counterpart discal sections 9 and 10, inner section 9 having a central projecting threaded tubular stud 9a to protrude through a central hole 10a in outer section 10. Each section has a flat central portion 11 of relatively large diameter (not less than that of the drum), an annular bulged portion 12 surrounding and concentric with the central portion, and an annular skirt-forming portion 13 diverted from the plane of the central portion in the same direction as the bulge is formed (such bulge and the diversion of portion 13, on the one hand, and the boss 9a, on the other, being from opposite sides of the inner section). (By defining the portion 12 as "bulged" I mean that in forming it so a groove develops at the inner side of the section as appears in Figs. 1 and 3.) The thickness of annulus 8 is less than that of the casing, so that in the present case each inner edge of the latter produces with the former a stepped formation, wherefore the portion 13 is bent to conforming stepped form, all as clearly shown in Figs. 1 and 2. Both sections are provided with holes 14 arranged in the same relation about their centers and to each other as the studs 3 of the drum. When the sections are assembled as shown in Fig. 1 they together provide a circumferential seat for the inner tube (through the medium of the annulus 8, if present). One half of this seat is afforded by each section, as by providing the section, in coincidence with the juncture of its portions 12 and 13, with a cylindrical bead $a$ which projects oppositely with respect to the bulge and preferably so that its free edge is flush with the corresponding face of the central portion 11. In the example each skirt-forming portion 13 is formed separately from what I term the body portion (comprising the central portion 11 and bulged portion 12) and the bead is formed by a laterally projecting marginal flange on the body portion and a laterally projecting flange at the inner margin of the skirt-forming portion, the latter flange embracing and being riveted, as at $b$, to the former flange.

At the convex side of the bulge of the outer section are secured clips 15 for attachment of the hub-cap 16.

To assemble the wheel structure the two sections of the wheel are fitted to the tire in the manner shown by Fig. 1, with their holes 14 in register (which latter may be facilitated by providing studs 18 on one section adapted to engage in holes 19 in the other section). Thereupon a nut 17 is screwed on the boss 9a and made to clamp the two sections together. The hub-cap 16 having been seated in the central cavity formed by the bulge of the outer section and secured by the clips 15 the wheel structure is then applied to the drum, the central cavity formed by the bulge of the inner section facilitating centralizing of the wheel structure with respect to the drum, whereupon nuts 4 are screwed on studs 3 and made to clamp the wheel structure to the drum.

The annulus 8 is not indispensable, but it is preferably present to bridge the crevice between the flanges a and thus insulate the inner tube from such crevice, preventing a possible blow-out.

As indicated, the primary function of the studs 3 is to secure the assembled wheel to the drum but, instead of relying on these studs to assume the load thrust of the drum, with consequent shearing effort on the studs, such thrust is assumed by the central stud 2 which the inner wheel section snugly fits, as shown. Further, instead of relying on studs 3 to oppose downward displacement of the inner wheel section relatively to the outer section, with consequent shearing effort on such studs, the outer section snugly as shown fits the central boss 9a of the inner section. In short, the wheel as a whole is supported relatively to the drum and its parts are supported relatively to each other mainly centrally of the system.

Having thus fully described my invention what I claim is:

A wheel comprising two discal sections and means to secure them together in concentric relation to each other, each section comprising a generally flat central portion, an annular portion around the central portion and bulged in one direction from the plane of the central portion, a skirt-forming annular portion around the first annular portion and diverted in said direction from said plane, and an annular bead coincident with the line of juncture between the two annular portions and projecting from both of them in the other direction toward said plane and toward the other section, said sections having their bulged portions, skirt-forming portions and beads respectively opposed to each other.

BOZHIDAR M. YANKOVITCH.